United States Patent [19]
Ohms

[11] Patent Number: 5,001,413
[45] Date of Patent: Mar. 19, 1991

[54] METHOD OF OPERATING A SWITCHING REGULATOR AND APPARATUS THEREFOR

[75] Inventor: Franz Ohms, Oberrot-Hausen, Fed. Rep. of Germany

[73] Assignee: ANT Nachrichtentechnik GmbH, Backnang, Fed. Rep. of Germany

[21] Appl. No.: 399,119

[22] Filed: Aug. 25, 1989

[30] Foreign Application Priority Data

Aug. 25, 1988 [DE] Fed. Rep. of Germany ....... 3828816

[51] Int. Cl.[5] .............................................. G05F 1/56
[52] U.S. Cl. .................................... 323/285; 323/282; 323/242; 323/326
[58] Field of Search ............... 323/282, 283, 284, 285, 323/288, 241, 242, 246, 259, 322, 325, 326, 344, 345, 349, 351; 363/20, 21, 24, 25, 26, 41, 44

[56] References Cited

U.S. PATENT DOCUMENTS

| | | |
|---|---|---|
| 4,316,136 | 2/1982 | Saxarra et al. ...................... 323/282 |
| 4,580,090 | 4/1986 | Bailey et al. ...................... 323/282 X |
| 4,618,812 | 10/1986 | Kawakami ...................... 323/285 X |
| 4,712,169 | 12/1987 | Albach ............................. 323/222 X |
| 4,719,552 | 1/1988 | Albach et al. .................... 323/222 X |
| 4,816,982 | 3/1989 | Severinsky ........................ 323/285 X |
| 4,862,057 | 8/1989 | Contartese et al. ................. 323/285 |

FOREIGN PATENT DOCUMENTS

| | | |
|---|---|---|
| 2739387 | 3/1979 | Fed. Rep. of Germany . |
| 2920166 | 11/1980 | Fed. Rep. of Germany . |
| 3302879 | 8/1984 | Fed. Rep. of Germany . |
| 3609731 | 9/1987 | Fed. Rep. of Germany . |
| 2456970 | 5/1980 | France . |
| 8903609 | 4/1989 | PCT Int'l Appl. . |
| 1172501 | 1/1967 | United Kingdom . |

OTHER PUBLICATIONS

Richard Redl & Nathan O. Sokal, "Near-Optimum Dynamic Regulation of DC-DC Converters . . . ", IEEE, vol. Pe 1, No. 3, Jul. 1986.
Otto Macek, "Schaltnetzteile Motor Steuerungen", pp. 101–102, Hüthig Verlag Heidelbergen, 1982.

Primary Examiner—Peter S. Wong
Assistant Examiner—Emanuel Todd Voeltz
Attorney, Agent, or Firm—Spencer & Frank

[57] ABSTRACT

A switching regulator including a direct voltage source for producing an input voltage, an electronic switch connected between the voltage source and an output for switching the input voltage to the output, a pulse width modulator connected for controlling the electronic switch, a sawtooth signal generator connected for feeding the pulse width modulator a sawtooth signal of constant maximum amplitude, and a proportional signal circuit connected for feeding the pulse width modulator a signal proportional to current through the electronic switch. In order to suppress interference components on the direct input voltage, the switching regulator additionally includes a further signal circuit connected for feeding the pulse width modulator a further signal having an amplitude which is a function of the magnitude of the input voltage of the voltage source, and controllable signal circuitry for selectively choosing the amplitudes of the signals fed to the pulse width modulator in such a way that the arithmetic mean of the current through the inductance of the switching regulator is maintained constant.

9 Claims, 4 Drawing Sheets

METHOD OF OPERATING A SWITCHING REGULATOR AND APPARATUS THEREFOR

BACKGROUND OF THE INVENTION

The present invention relates to a switching regulator of the type including a direct input voltage source, an electronic switch connected between the voltage source and an output, a pulse width modulator connected for controlling the electronic switch, a sawtooth signal generator connected for feeding the pulse width modulator a sawtooth signal of constant amplitude, and a proportional signal circuit for feeding the pulse width modulator a signal proportional to current through the electronic switch.

Such a switching regulator is disclosed in German Patent No. 2,920,166. The combined control of the electronic switch, or setting member, by a sawtooth signal and a signal proportional to switch current results in a switching regulator of high stability, particularly with respect to the tendency to oscillate, even in cases where the keying ratio (switch on-to-off ratio) is more than half the duration of the period of the switching frequency.

SUMMARY OF THE INVENTION

It is an object of the present invention to improve the above described switching regulator so that interference signals on the input voltage will be optimally suppressed and their effect on the output voltage of the switching regulator will be minimized.

The above and other objects are accomplished according to the invention by the provision of a switching regulator of the type first described above wherein there is additionally included a circuit connected to the pulse width modulator for feeding the pulse width modulator a signal having an amplitude which is a function of the magnitude of the direct input voltage and signals means for selectively chosing the amplitudes of the signals controlling the pulse width modulator in such a way that the arithmetic mean of the current through the main inductance of the switching regulator is maintained constant.

It is known to change the keying ratio as a function of the input voltage of a switching regulator, in that the amplitude of a sawtooth signal is changed as a function of the magnitude of the input voltage *Schaltnetzteile - Motorsteuerungen [Switch mode Power Supplies - Motor Controls]*, published by Dr. Alfred Hüthig Verlag, Heidelberg, 1982, pages 101–102). However, no suggestion can be found in this procedure to operate a switching regulator to optimally suppress voltage ripples from the main bus.

German Patent No. 3,609,731 discloses, in the context of a switching regulator of a different type, regulating out voltage ripples on the input voltage (main bus) by changing the amplitude of a sawtooth signal, which controls the pulse width modulator of the switching regulator, as a reciprocal function of the input voltage. However, this measure does not bring the result that it increases the regulating velocity of a second control circuit which also acts on the pulse width modulator.

The present invention offers several advantages. Alternating voltage components on the input voltage of the switching regulator, particularly CS (conducted susceptibility) interferences are attenuated considerably. Thus, expenditures for filters in the load circuit of the switching regulator can be kept low. Stability problems do not occur. Input voltage suppression can be used with numerous types of switching regulators. By operating the switching regulator according to the invention, the arithmetic mean of the current through the main inductance of the switching regulator is independent of the input voltage and thus also independent of alternating voltage components on the direct input voltage. The technique according to the invention does not require high jump signals to be regulated out by the portion of the control circuit of the pulse width modulator which evaluates the output voltage, thus leading to a faster regulating response of the switching regulator as a whole.

BRIEF DESCRIPTION OF THE DRAWINGS

The invention will now be described in greater detail with reference to the drawing figures.

DESCRIPTION OF THE PREFERRED EMBODIMENTS

Figure 1:
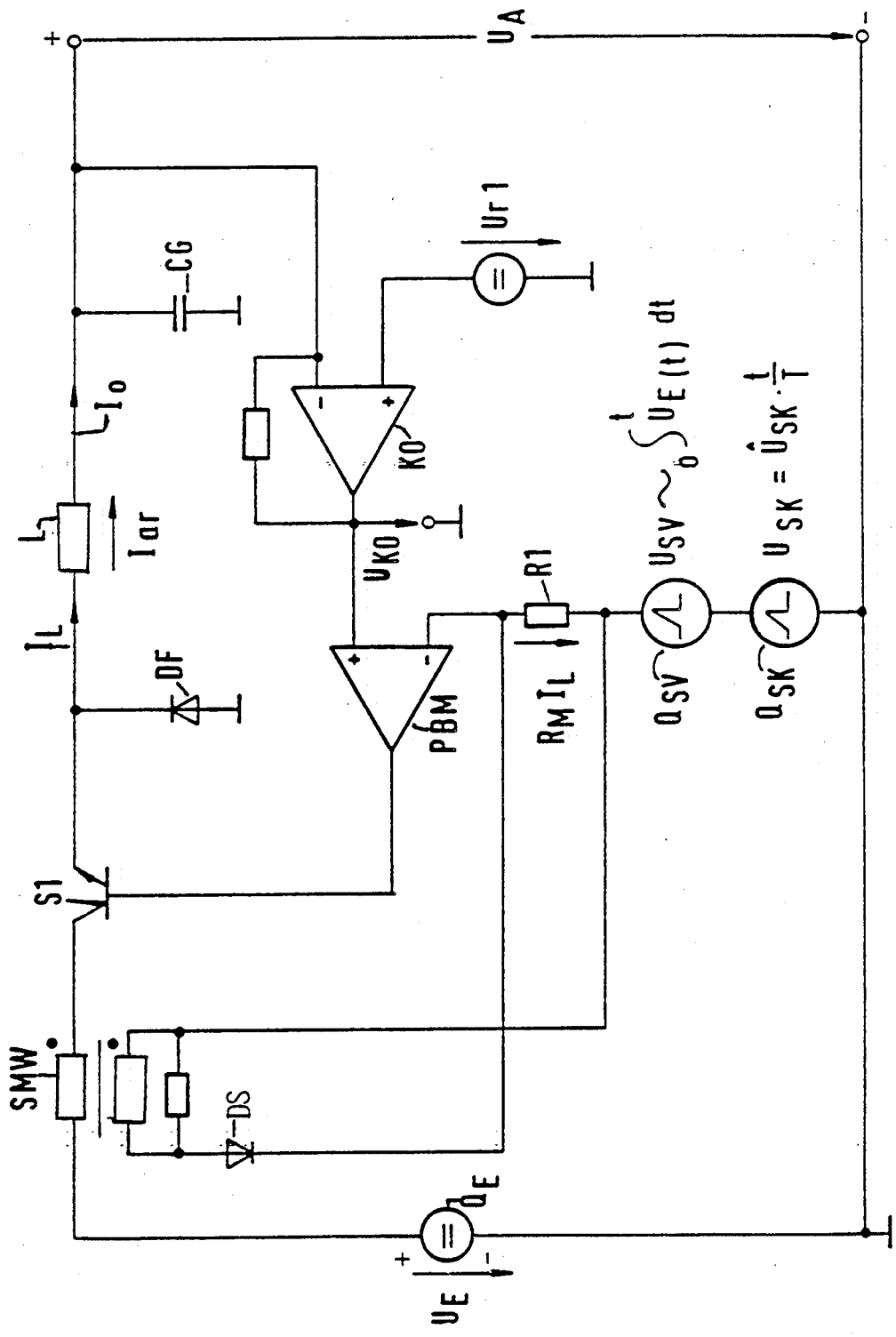
FIG. 1 is a circuit schematic of a switch mode buck regulator according to an embodiment of the invention.

Referring to FIG. 1, there is shown a switching regulator according to the invention in the form of a buck regulator which includes a direct input voltage source $Q_E$ (main bus) having a terminal voltage $U_E$. A series connection of an electronic switch S1 in the form of a switching transistor and a switching regulator main inductance L lies between the positive pole of voltage source $Q_E$ and the positive pole of the buck regulator output which has an output voltage $U_A$. A flywheel diode DF is connected between ground and a point between the emitter of transistor switch S1 and inductance L. A smoothing capacitor CG is connected between ground and the end of inductance L remote from transistor switch S1. Output voltage $U_A$ is fed to the negative input of a comparator KO which compares output voltage $U_A$ with a direct reference voltage Ur1 applied to the positive input of comparator KO. If output voltage $U_A$ exceeds reference voltage Ur1, comparator KO produces an output voltage $U_{KO}$ which is fed to the non-inverting input of a pulse width modulator PBM whose output signal determines the keying ratio (on-to-off duration ratio) of electronic switch S1. A series connection of a resistor R1 and two signal sources $Q_{SV}$, $Q_{SK}$, which furnish sawtooth signals $U_{SV}$ and $U_{SK}$, respectively, is connected between the inverting input of pulse width modulator PBM and common ground. A voltage proportional to the input current of the switching regulator is obtained at resistor R1. This is accomplished by way of a current converter SMW which has a primary winding lying in the switching regulator input circuit between voltage source $Q_E$ and electronic switch S1. Induced current in the secondary winding of current converter SMW is rectified by a diode DS and flows through resistor R1. Signal source $Q_{SK}$ carries the following sawtooth voltage:

$$U_{SK(t)} = U_{SK} \cdot t/T$$

where
t = time
T = the period the sawtooth signal: and
$U_{SK}$ = the maximum amplitude of the sawtooth voltage.

The maximum amplitude $U_{SK}$ of the sawtooth voltage is kept constant.

For reasons of stability, the following must apply for the entire sawtooth voltage $U_{SG(t)} = U_{SK(t)} + U_{SV(t)}$:

$$U_{SG} > \frac{(2U_A - U_E) R_M \cdot T}{L}$$

where $R_M$ is the resistance value of a resistor for detecting the current through electronic switch S1 and, in the case of current detection by means of a current converter as shown in FIG. 1, $R_M$ is the resistance value multiplied by the reciprocal of the conversion ratio of current converter SMW. It then applies that $R_M = R1/\ddot{u}I$ where $\ddot{u}I$ is the conversion ratio of current converter SMW. Thus, to be able to maintain the stability condition, it is necessary to have a minimum sawtooth amplitude which cannot be made available merely by control as a function of the output voltage $U_A$. The effect of the control current amplitude can be changed in that the sawtooth amplitude is modulated by the input voltage. For this purpose, a further signal source $Q_{SV}$ is provided which carries the sawtooth voltage $$U_{SV(t)} = 1/RC \int_0^t U_{E(t)} dt$$

This sawtooth voltage $U_{SV(t)}$ is thus proportional to the integrated input voltage $U_{E(t)}$. The time dependency of the input voltage $U_E$ of the switching regulator results essentially from superposed alternating components such as, for example, a 100 Hz ripple [hum] voltage in a switch mode power supply. Optimum suppression of these ripples is present if the arithmetic mean of the current $I_O$ through main inductance L of the switching regulator remains constant. In order to optimally suppress changes in the input voltage and maintain the stability requirement, conditions must be met which result from the following equations.

The arithmetic mean of the current through the inductance is the following:

$$I_{ar(D)} = I_0 + \frac{U_E - U_A}{2L} \cdot D \cdot T$$

where D (duty cycle) indicates the on-time of electronic switch S1 relative to the period T of the sawtooth signal. Using $$I_0 = \frac{U_{KO}}{R_M} - D \left[ \frac{U_E - U_A}{L} \cdot T + \frac{U_{SG}}{R_M} \right]$$

where $U_{KO}$ is the voltage at the positive input of the pulse width modulator PBM, and with $$U_{SG} = K_A \cdot U_A + K_E \cdot U_E$$

it follows that $$I_{ar} = \frac{U_{KO}}{R_M} - \left[ \frac{T}{2L} + \frac{K_E}{R_M} \right] \cdot U_A -$$

$$\left[ \frac{K_A}{R_M} - \frac{T}{2L} \right] U_A^2 \cdot \frac{1}{U_E}$$

If $K_A$ is selected to be $$K_A = \frac{R_M \cdot T}{2L}$$

the arithmetic mean Iar is independent of input voltage UE and thus also independent of interference on input voltage UE.

KE is now selected in such a way that it meets the stability condition $$U_{SG} = \frac{I_{Emin} \cdot R_M \cdot T}{L}$$

The following then applies for the inverted input voltage U- of pulse width modulator PBM:

$$U- = K_I \cdot I_{L(t)} + U_{SK} \cdot \frac{t}{T} + \frac{\int_0^t U_{E(t)} dt}{RC}$$

where $K_I$ is the proportionality factor between the current through resistor R1 and the current through the primary winding of current converter SMW. With $$I_{L(t)} = I_{L(t=0)} + \frac{\int_0^t (U_{E(t)} - U_A) dt}{L}$$

there then results the following:

$$U- = K_I \cdot I_{L(t=0)} + \frac{1}{T} \left[ \frac{K_I \cdot T}{L} \int_0^t U_{E(t)} dt + \right.$$

$$\left. \frac{T}{RC} \int_0^t U_{E(t)} dt + U_{SK} \cdot t - \frac{K_I U_A \cdot T}{L} \cdot t \right]$$

Figure 2:
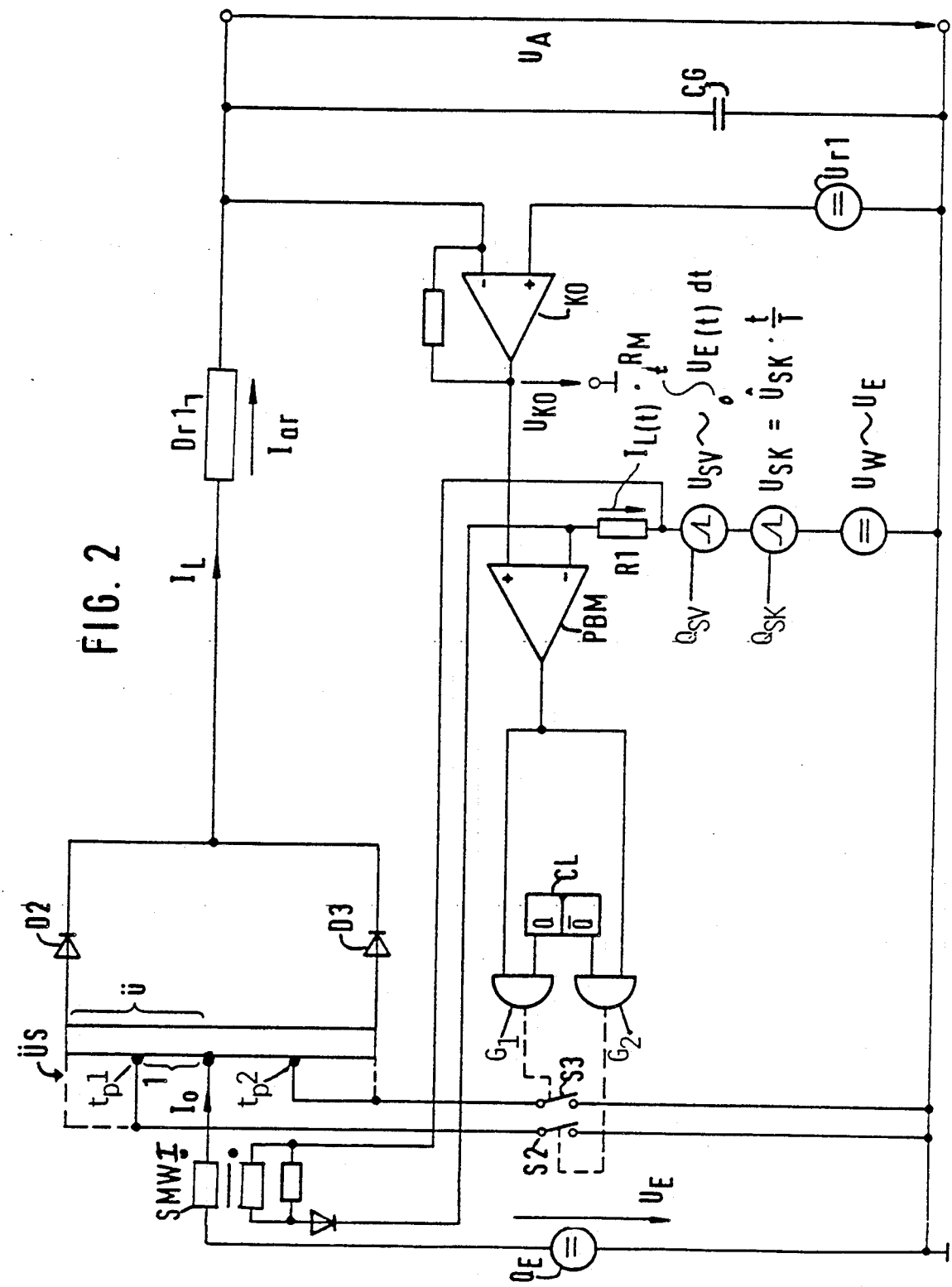
FIG. 2 is a circuit schematic of a modified switch mode boost regulator according to a further embodiment of the invention.

FIG. 2 shows a modified boost regulator which is operated so that the arithmetic mean of the current through its choke Dr1 is constant. This type of switching regulator includes an autotransformer ÜS having a transformer ratio ü. The center of the windings of the autotransformer is connedted with the positive pole of direct input voltage source $U_E$ which carries the voltage $U_E$ via the primary of the current converter SMWI. The windings on either side of the center are wound in the same direction and the ends of the windings of autotransformer e,uml/U/ S are connected, via respective diodes D2 and D3 with one end of choke Dr1. The other ends of choke Dr1 constitues one output terminal of the switching regulator. The other output terminal is connected with the negative pole of voltage source $Q_E$. Output voltage $U_A$ is available between the output terminals. Between the negative pole of voltage source $Q_E$ and taps tp1 and tp2 of autotransformer e,uml/U/ S, which are arranged symmetrically to the center of the windings, a pair of setting members in the form of push-pull electronic switches S2 and S3 are provided.

Electronic switches S2 and S3 receive their input pulses via pulse width modulator PBM and a customary pulse dividing stage for push-pull signals composed of two AND gates G1 and G2 and one push-pull flip-flop CL (e.g. as part of an integrated circuit of type TDA 4700). Alternatively, the pair of electronic switches S2 and S3 may be connected to the winding ends of autotransformer üS (shown by dashed lines in FIG. 2). As in the switching regulator of FIG. 1, output voltage $U_A$ is evaluated by way of comparator KO, whose output $U_{KO}$ is fed to the non-inverting input of pulse width modulator PBM. The regulator transfer function is given by:

$$U_A = U_E + u \cdot U_E \cdot \frac{t_{ein}}{T}$$

with $t_{ein}$ being the on-time of both switches S2 and S3.

The inverting input of pulse width modulator PBM also receives a voltage which is proportional to the choke current IL of the switching regulator, i.e. the voltage drop across resistor R1 due to current detection by means of current converter SMW.

Figure 4:
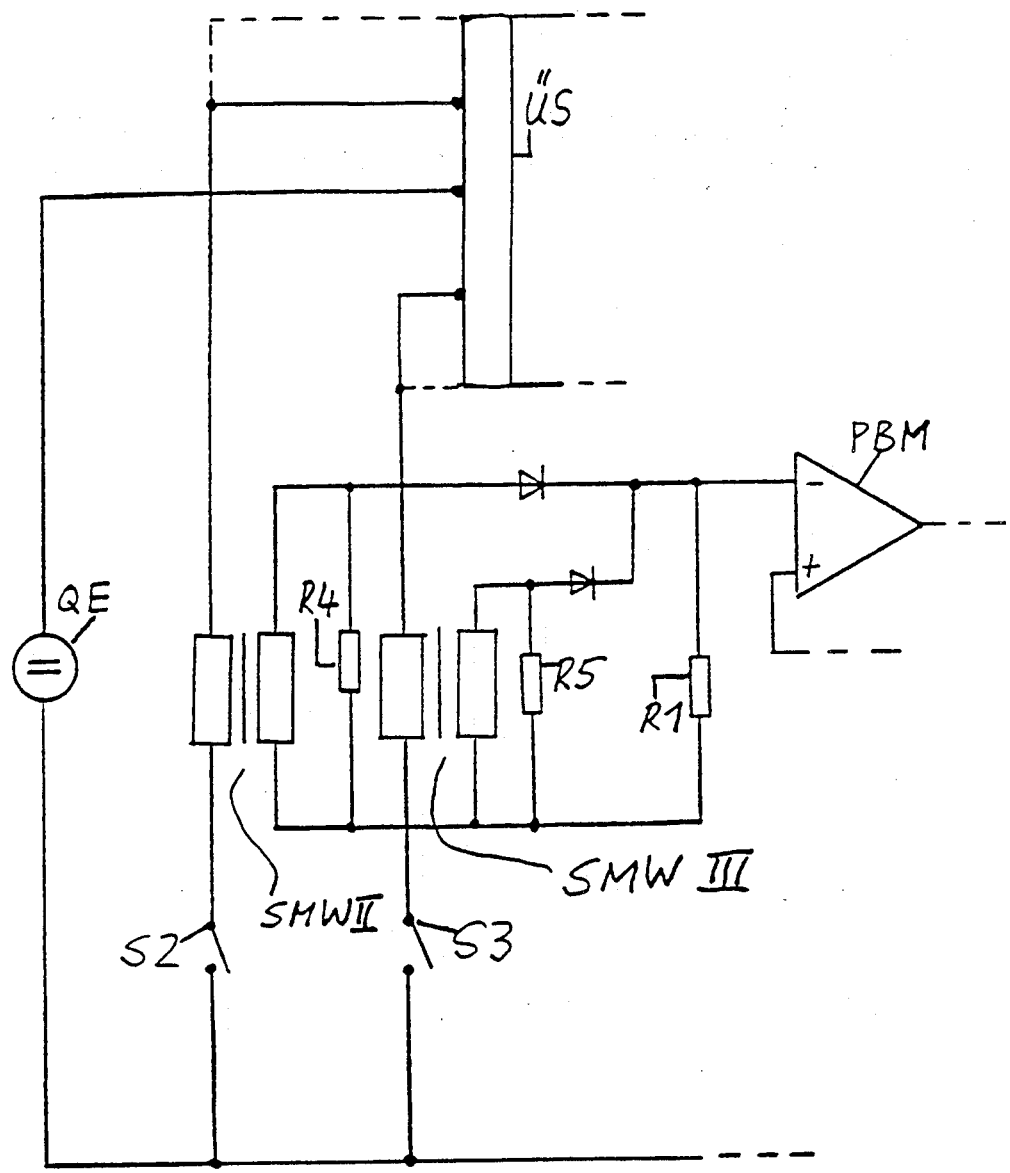
FIG. 4 is a circuit schematic showing an alternative embodiment for detecting current.

In the embodiment of FIG. 2, the primary winding of a corresponding current converter SMWI lies between voltage source $Q_E$ and the center tap of autotransformer ÜS. Alternatively, current converter may lie in the current paths of switches S2 and S3. In the latter case, current converter would then have two primary windings, with one primary winding lying in the current path of each switch. In yet another alternative, a separate current measuring converter may be provided for each switch current path. In this case the secondary windings of the two current measuring converters SMWII and SMWIII respectively are each connected in parallel to resistor R1 by way of respective rectifier circuits as shown in FIG. 4. The latter realization has the advantage that asymmetries in the switching times of switches S2 and S3 will not lead to falsified measurements for the current detected by means of resistor R1. Resistors R4 and R5 of the rectifier circuit are dimensioned to be so highly resistive that the respective current converter through which no current flows can be demagnetized quickly and completely.

Referring again to FIG. 2, the current proportional voltage is connected in series with a sawtooth voltage $U_{SK} = U_{SK} \cdot t/T$ of constant maximum amplitude and an additional sawtooth voltage $U_{SV}$ which is proportional to the integrated input voltage $U_{E(t)}$. However, in deviation to FIG. 1, a direct voltage $U_W$ whose magnitude is proportional to input voltage $U_E$ is additionally provided in series with the current proportional voltage across R1.

For reasons of stability, the following must apply for sawtooth voltage $U_{SK}$:

$$U_{SK} > [2U_A - (u+2) U_{Emin}] \frac{R_M \cdot T}{L} = \frac{R_M \cdot T \cdot U_A}{L} \cdot \frac{u}{u+1} \text{ for } U_{Emin} = \frac{U_A}{1+u}$$

Resistor $R_M$ is a fictitious resistor which, multiplied by the choke current $I_{L(t)}$, results in a current proportional voltage applied to pulse width modulator PBM. Here $$R_M = \frac{R1(u+1)}{uII}$$

where üII is the transformer ratio of current converter SMWI.

In order for the arithmetic mean $I_{ar}$ of the current

In order for the arithmetic mean $I_{ar}$ of the current through switching regulator choke Dr1 to become independent of input voltage $U_E$, and therefore constant, the following conditions must apply:

$$\text{For } I_{ar} = \frac{U_{KO}}{R_M} - \frac{U_A \cdot T \cdot (2+u)}{2L \cdot u} + \frac{U_{SK} - K_E \cdot U_A}{u \cdot R_M} +$$

$$\left[ \frac{(1+u) \cdot T}{u \cdot 2L} - \frac{K}{R_M} + \frac{K_E}{u \cdot R_M} \right] \cdot U_E +$$

$$\frac{1}{U_E} \left[ \frac{U_A^2 \cdot T}{2L \cdot u} - \frac{U_A \cdot U_{SK}}{u \cdot R_M} \right]$$

as derived from the circuit arrangement according to FIG. 2 the terms:

$$\left[ \frac{(1+u) \cdot T}{u \cdot 2L} - \frac{K}{R_M} + \frac{K_E}{u \cdot R_M} \right] \text{ and}$$

$$\left[ \frac{U_A^2 \cdot T}{2L \cdot u} - \frac{U_A \cdot U_{SK}}{u \cdot R_M} \right] \text{ must be 0.}$$

In the above equation $U_{K0}$ represents the voltage at the positive input of pulse width modulator PBM and K and $K_E$ represent constants. Constant K here is the proportionality factor between direct voltage $U_W$ and input voltage $U_E$. These constants are chosen according to following conditions.

To bring the second term to 0 for the amplitude USK of the constant sawtooth voltage, the following condition must be met:

$$U_{SK} = \frac{T \cdot R_M}{2L} \cdot U_A$$

Also, the following must apply for the input voltage dependent sawtooth component (stability condition):

$$K_E \cdot U_{Emin} = \frac{R_M \cdot T \cdot U_A}{L} \cdot \frac{u}{u+1} - \frac{R_M \cdot T \cdot U_A}{2L}$$

With $$U_{Emin} = \frac{U_A}{1+u} \text{ constant } K_E \text{ is:}$$

$$K_E = \frac{R_M \cdot T}{2L} \cdot (u-1),$$

ps and if the first term equals 0, constant K is given by:

$$K = \frac{R_M \cdot T}{L}$$

The following then applies for the arithmetic mean of the current:

$$I_{ar} = U_{KO} \cdot \frac{1}{R_M} + \frac{U_{SK}}{R_M \cdot u} - \frac{T \cdot (u+2)}{2L \cdot u} \cdot U_A - \frac{U_A \cdot K_E}{R_M \cdot u}$$

This equation simplifies if the above relations for $K_E$ and $U_{SK}$ are employed to:

$$I_{ar} = \frac{U_{KO}}{R_M} - \frac{U_A \cdot T}{L}$$

So $I_{ar}$ being independent from input voltage $U_E$.

$$\rightarrow I_{ar} \neq f(U_E)$$

Figure 3:
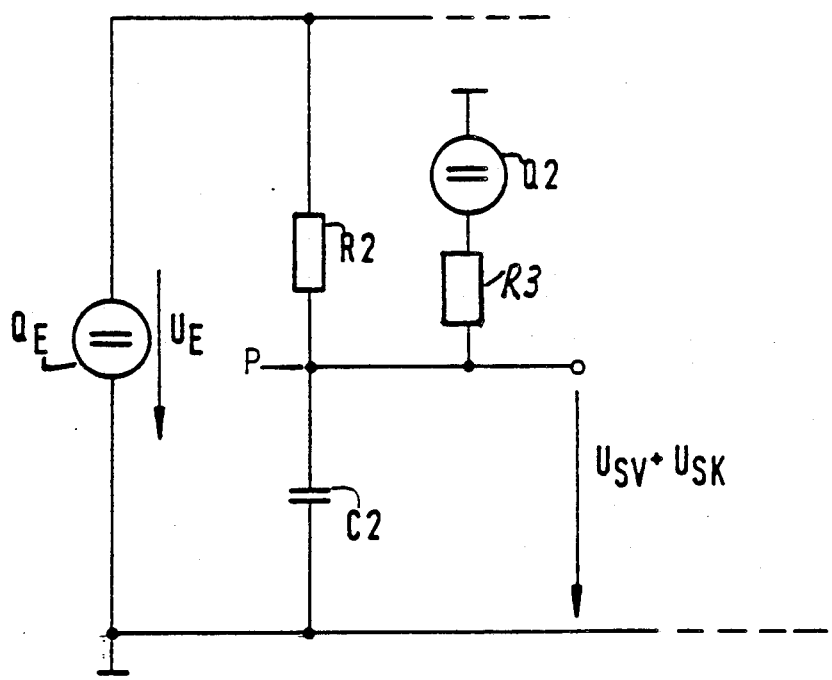
FIG. 3 is a circuit schematic showing the generation of the sawtooth signals for the buck regulator of FIG. 1.

For the buck converter shown in FIG. 1, the two sawtooth signals can be easily derived by means of the circuit of FIG. 3. To accomplish this, direct input voltage source $Q_E$ is connected in parallel with the series connection of an RC circuit comprising resistor R2 and capacitor C2. Resistor R2 and capacitor C2 have a common connecting point P connected via a resistor R3 with a reference direct voltage source Q2. A voltage $U_{SV} + U_{SK}$ is obtained at point P and is fed, together with the current proportional voltage signal at resistor R1, to the inverting input of pulse width modulator PBM. Capacitor C2 here integrates direct input voltage $U_E$.

Obviously, numerous and additional modifications and variations of the present invention are possible in light of the above teachings. It is therefore to be understood that within the scope of the appended claims, the invention may be practiced otherwise than as specifically claimed.

What is claimed is:

1. In a switching regulator including: a direct voltage source for producing an input voltage; output means; controllable electronic switch means connected between the voltage source and the output means for switching the input voltage to the output means; a pulse width modulator connected for controlling the electronic switch means and having two inputs; sawtooth signal means connected to one input of the pulse width modulator for feeding the pulse width modulator a sawtooth signal of constant maximum amplitude; and proportional signal means connected to the one input of the pulse width modulator for feeding the pulse width modulator a signal proportional to current through the electronic switch means, the improvement comprising:

further sawtooth signal means for generating a further sawtooth signal having an amplitude proportional to the input voltage integrated over time and being connected to said one input of said pulse width modulator for feeding said pulse width modulator the further sawtooth signal; inductance means connected between said controllable electronic switch means and said output means; and controllable signal means coupled to at least one of the inputs of said pulse width modulator and producing control voltages which are functions of the amplitude of the voltage at said output means and of the input voltage for selectively choosing the amplitudes of the signals fed to the pulse width modulator so that the arithmetic mean of the current through said inductance means is maintained constant.

2. A switching regulator as defined in claim 1, wherein said switching regulator is configured as a buck mode regulator.

3. A switching regulator as defined in claim 1, wherein said sawtooth signal means and said further sawtooth signal means comprise: a first resistor and a capacitor having a common connecting point and forming a series circuit connected in parallel across said voltage source; a reference direct voltage source; and a second resistor having one terminal connected to said common connecting point and another terminal connected to said reference direct voltage source; said capacitor being charged by said voltage sources via said first and second resistors to produce the sawtooth signal and further sawtooth signal at said common connecting point.

4. A switching regulator as defined in claim 1 configured as a modified boost mode regulator, wherein said electronic switch means comprises two push-pull electronic switches and an autotransformer, said output means comprises first and second output terminals, said inductance means comprises a choke having opposite ends and said voltage source has first and second poles; and further including first and second diodes polarized in the same direction and connected to one said end of said choke; said autotransformer having symmetrical windings and including a center tap connected to the first pole of said voltage source, first and second winding ends connected to a respective one of said first and second diodes and two taps positioned symmetrically with respect to said center tap; the other end of said choke being connected to said first output terminal; said two push-pull switches having one pair of terminals connected with the second pole of said voltage source and with said second output terminal, and a second pair of terminals connected to said two taps, respectively; and wherein said further signal means produces one signal proportional to the amplitude of the input voltage of said voltage source and a second signal having an amplitude proportional to the input voltage of said voltage source integrated over time, said one signal and said second signal being fed to said pulse width modulator.

5. A switching regulator as defined in claim 4, wherein said two taps comprise said winding ends.

6. A switching regulator as defined in claim 4, wherein the one signal has a proportionality factor (K) relative to the input voltage of said voltage source defined by:

$$K = \frac{R_M \cdot T}{L}$$

wherein the maximum amplitude ($U_{SK}$) of the further sawtooth signal is selected to be $$U_{SK} = \frac{T \cdot R_M}{2L} \cdot U_A$$

where
- $U_A$ is the output voltage at said output terminals,
- $L$ is the inductance of said choke,
- $T$ is the period of the switching frequency of said electronic switch;
- $R_M$ is a fictitious resistance which, when multiplied by the choke current ($I_{L(t)}$), produces a current component voltage applied to said pulse width modulator.

7. A switching regulator as defined in claim 4, wherein said proportional signal means comprises a resistor connected to an input of said pulse width modulator and a current converter having a primary winding connected to said center tap of said autotransformer and a secondary winding connected to said resistor.

8. A switching regulator as defined in claim 4, wherein said proportional signal means comprises a resistor connected to an input of said pulse width modulator and current converter means having a primary winding in the current path of each said push-pull switch and secondary winding means connected in parallel with said resistor.

9. A switching regulator as defined in claim 1, wherein said two inputs of said pulse width modulator comprise an inverting input and a non-inverting input; and further including a comparator having a negative input connected to said output means for receiving an output voltage, a positive input, and an output, and a reference voltage source producing a reference voltage and connected to the positive input of said comparator, said comparator comparing the output voltage with the reference voltage and producing a control voltage at the output of said comparator if the output voltage exceeds the reference voltage, said control voltage being fed to the non-inverting input of said pulse width modulator, and said sawtooth signal means, signal means and said further signal means being connected for feeding the inverting input of said pulse width modulator the sawtooth signal of constant amplitude, the signal proportional to the current through the electronic switch means and the signal having an amplitude which is a function of the magnitude of the input voltage of said voltage source.

* * * * *